Figure 3:
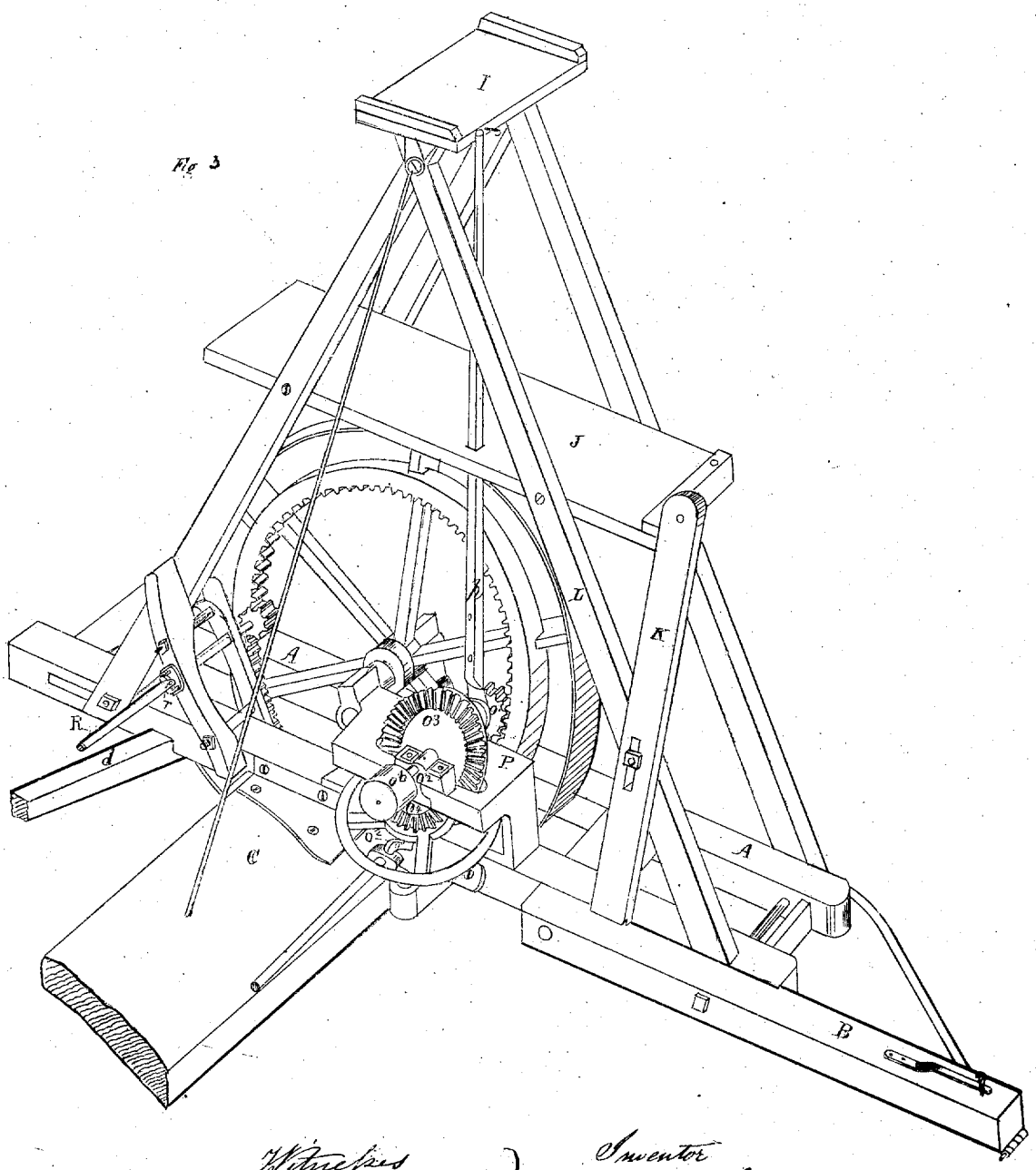

W. H. Seymour,
Harvester-Rake.
No. 1683
Reissued May 31. 1864
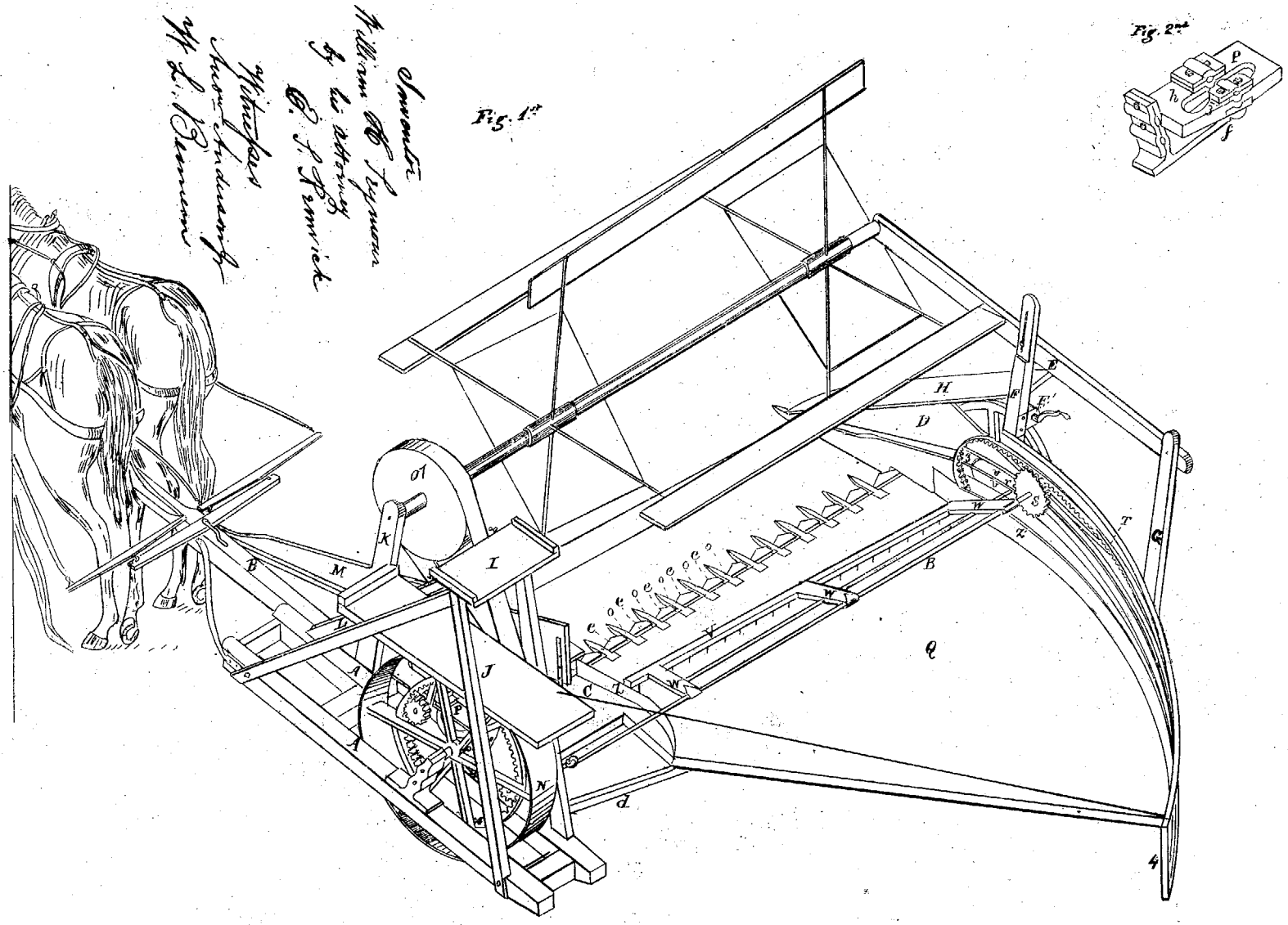
Inventor
William H. Seymour
by his attorney
C. S. Kenwick
Witnesses
Anon. Anderson
W. L. Beemen Sheet 2 - 2 Sheets W. H. Seymour,
Harvester Rake.

No 168.3

Reissued May 31 1864

Witnesses
Andr. Anderson Jr
W. L. Bennem

Inventor
William H. Seymour
by his attorney
E. S. Renwick

UNITED STATES PATENT OFFICE.

WM. H. SEYMOUR, OF BROCKPORT, NEW YORK, ASSIGNEE, BY MESNE ASSIGNMENTS, TO DAYTON S. MORGAN, OF SAME PLACE.

IMPROVEMENT IN REAPING-MACHINES.

Specification forming part of Letters Patent No. 8,212, dated July 8, 1851; Reissue No. 1,003, dated July 10, 1860; Reissue No. 1,683, dated May 31, 1864.

*To all whom it may concern:*

Be it known that I, WILLIAM H. SEYMOUR, of Brockport, in the county of Monroe and State of New York, have invented new and useful Improvements in Reaping-Machines for Cutting all Kinds of Small Grain; and I do hereby declare that the following is a full and exact description of the construction and operation of the same, reference being had to the annexed drawings, making a part of this specification, in which—

Figure 1 represents a view in perspective of a reaping-machine to which my improvements are applied as it would appear to a spectator in the rear and on the stubble side thereof. Fig. 3 represents a similar view of the gearing-frame as it would appear to a spectator stationed at the point of the divider and looking toward the driving-wheel; and Fig. 2 represents an isometrical view of what I term a "combination of boxes in one casting," in which the gearing is mostly supported.

The first part of the invention, which constitutes the subject-matter of this patent, consists of the combination, in a harvesting-machine, of the following three members, viz: first, a cutting apparatus composed of a finger-beam, with its fingers and cutter; second, a reel to bear the grain against said cutting apparatus and insure its delivery upon a platform in the rear thereof; third, a quadrant-shaped platform in the rear of the cutting apparatus, with its delivery side arranged, substantially as hereinafter described, at an angle to the finger-beam, so that the grain cut by the cutting apparatus and compelled by the reel to fall backward upon the platform can be moved from the cutting apparatus head foremost, swept round in a curve, and discharged upon the ground crosswise to the direction of the swath and out of the track of the horses when cutting the succeeding swath.

The second part of the invention consists of the combination, in a harvesting-machine, of the following members, viz: first, a cutting apparatus, as above specified; second, a quadrant-shaped platform, as above specified; third, a sweep-rake, or rake arranged to sweep in a circular curve over said platform when acting on the grain; fourth, mechanism for moving the same; fifth, devices for preventing the rake-teeth from rising out of the cut grain on the platform, so that when this part of my invention is used the cut grain falling upon the platform is delivered therefrom with certainty automatically head foremost and in circular curves.

A convenient arrangement of mechanism for carrying my invention into effect is shown in the accompanying drawings, which represent a harvesting-machine having an automatic rake and embodying the improvements which constitute the subject-matter of this patent, as well as others which are set forth more particularly in other patents expiring at the same date. The main or wheel frame A is constructed of two pieces of timber framed parallel to each other and connected by three girts, one in the rear of the driving-wheel and two in front. The tongue B, to which the team is attached, is bolted to the front end of the inner side piece of the wheel-frame. The finger-beam or guard-piece C is attached to the inner side piece of the frame A, directly under the axle of the driving-wheel, by means of a cast-iron bracket and bolts. To the opposite end of the guard-piece C is attached the divider-piece D, which extends about three feet back of it and two and a half feet in front of it. A brace, *d*, extends from the back end of the wheel-frame A to the back end of the divider-piece D.

The reel-bearer E is supported by the posts F and G, which extend up from the divider-piece D. The reel-bearer extends in front of the wheel-post F about three feet, and has one end of the reel-shaft hung upon its front end. The divider-board H is made fast to the front end of the divider-piece. It is also secured to the wheel-post F, about two feet above the divider-piece. The seat I for the operator is constructed of four braces, extending up from the wheel-frame A, one from each corner of the frame, forming two triangles, parallel to each other, to the top of which the seat is attached. The foot-board J is bolted to three braces. The reel-post K, the lower end of which is inserted into a mortise in the inner side piece of the frame A, near its front end, passes up at the side of the diagonal brace L, to which it is attached by a bolt passing through a slot in it, and also through one in the brace. This post (to the upper end of which one end of the reel-shaft is hung) is supported in this manner to admit of its being raised and lowered to vary the height of the reel. A guard-board, M, extends from the tongue B to the guard-piece C for the purpose of bringing the grain to the sickle *e*. A brace of three-fourths-inch-round iron extends from the tongue to the guard-piece directly under the guard-board.

The driving-wheel N (three feet or more in diameter) is of cast-iron, but might be made of wood, and is hung on an axle that has its bearings (of cast-iron) bolted upon the upper side of the frame A. An internal spur cog-wheel, O, is cast upon the arms of the driving-wheel. A pinion, $o'$, which is hung on a transverse shaft, $o^2$, that has its bearings attached to the cast frame P in manner hereinafter described, meshes into this spur-wheel *o*. A bevel-wheel, $o^3$, about one foot in diameter, is hung on this shaft, and meshes into a bevel-pinion, $o^4$, hung on a vertical crank-shaft, $o^5$, that has its upper bearing in a box supported in the cast-iron frame P, and its lower bearing in a step bolted upon the inner side piece of the frame A.

The combination-box or cast frame P, Fig. 2, in which the gearing is mainly hung, has a long broad base, and is bolted to the inner side piece of the frame A. Near the back end of the base is an elevation of six or eight inches, to the back part of which is bolted another piece of casting, and thus two boxes are formed (one above the other) for the inner end of the axle of the driving-wheel, which axle is shifted from one to the other of these boxes to vary the height of cut. There is another elevation at the front end of the base corresponding in height nearly with the one at the back end, and the upper plate of said cast frame or combination-box extends from one of these elevations to the other, as shown at *h*, Fig. 2, and is made broader than the base or elevations, so as to project beyond them, as shown at 3, Fig. 2.

Near the center of this upper plate there is a slot made, in which the bevel-wheel is placed, its shaft being supported at each end by bearings on this plate. The upper crank-box, 4, is bolted to the under side of this plate directly under the bevel-wheel box *f*. By this arrangement of the gearing it is more compact than it could otherwise be made, and admits of a pitman-rod of sufficient length being used without the necessity of widening the machine to make room for the pitman-rod, which would have to be done were the gearing not thus compactly arranged. The mechanism can be thrown into or out of gear at will by means of a disconnecting-lever, *p*, which operates a sliding clutch on the driving-shaft $o^2$.

The sickle *e e e* is attached to the crank by means of a rod or pitman one and a half feet long, which gives the sickle a quick vibrating motion. The crank is two inches in length and gives the sickle a stroke of four inches. There is a pulley, $o^6$, four and a half inches in diameter, on the inner end of the bevel-wheel shaft, and another pulley, $o^7$, of nineteen inches in diameter, on the reel-shaft, in range with it, over which pulleys runs a belt that gives motion to the reel. The reel is made and operated in the usual manner.

The guard teeth or fingers *o o o o*, eighteen in number, (more or less,) are six inches long, made of cast-iron, and attached to the guard-piece or finger-beam C by means of wood-screws in their front edges and on their tops. These guard-teeth have slots through them, through which the sickle *e e e* vibrates, which slots are enlarged back of the sickle to prevent clogging. The side of the machine opposite the driving-wheel is carried on a wheel two and half feet in diameter, the axle of which slides vertically in guides secured upon the post F, in which guides it is raised or lowered by means of a rack and pinion, F.

The platform Q, instead of being made in a square form and extending back of the sickle only three or four feet, as heretofore, is of what I denominate a "quadrant" form—that is to say, that edge of it *q*, at which the grain is delivered forms a considerable angle with that edge of it, $p'$, at which the grain is received, so that the grain, instead of being raked off behind the machine, making it necessary to take up each swath as it is cut, is swept off in a circular curve and dropped far enough from the standing grain to be out of the way of the team while cutting the next swath, thereby obviating the necessity of taking up each swath before another can be cut. That side of the platform which is nearest the standing grain is curved from the outer end of the cutting apparatus to the hinder edge of the delivery side, and is provided with a fence, $Z'$, or guard, so as to prevent the escape of the cut grain and guide it along the platform to its deliverye-dge. The other guard, Z, prevents the grain from escaping laterally from the side of the platform which is nearest the driving-wheel.

The grain is raked from the platform of the machine by means of a rake that is made to travel back and forth in the following manner: The rake consists of the head V, into which the teeth are inserted, the attachments W W W, the lower ends of which are firmly secured to the rake-head, the guide-rod X, passing through the attachments W W W parallel to the rake-head V, and about the center of the rake, and the lever-arm or rake-rod R, which extends horizontally across the platform and through the upper ends of the attachments W W W, so as to revolve freely therein.

A pinion, *r*, of twelve cogs, (may be more or less,) is secured upon the end of the rake-rod R, which pinion meshes into the internal spur-wheel *o* and causes the rod to revolve. This rod is provided with a universal joint, $r'$, a few inches from the pinion *r*. The short section of the rod, between the joint and the pinion is supported in horizontal transverse position with respect to the plane of the driving-wheel by bearings secured upon the wheel-frame A, the universal joint thus forming the center of motion of the rake, as hereinafter more fully described. Another pinion, S, is secured on the rake-rod near its outer end, and is provided with cogs (or some irregular surface) to correspond with those of an endless rack, T, having internal teeth, in which it travels. This endless rack T has parallel sides and simicircular ends, and it is to be made of the shape required to produce the desired motions of the rake, as hereinafter described. It is secured upon the outer or grain end of the platform, and is so curved that in its top view it forms the arc of a circle or which the universal joint $r'$ forms the center and the rake-rod R the radius. This rod R also extends through the pinion S, and projects beyond it—say half an inch—in order that it may roll along the edge of the guide-plate U, which plate is secured in the center of the endless rack with its edges parallel to the sides thereof, and holds the pinion S in contact with the teeth of the rake in every part of its circuit, and also acts as a support to the outer end of the rake-rod.

The guide-rod X passes through one or more of the attachments W W W, and extends beyond the pinion S into the horizontal groove $y$ in the center of the endless rack T, as well as in that of the guide-plate U. It also projects beyond the outer end of the rake-rod R, that it may at all times continue in the groove.

The operation of the machine is as follows: As it is drawn forward the grain in front of the machine is divided from the remainder by the divider at the outer end of the finger-beam and its heads are borne by the reel toward the cutting apparatus, which severs the stalks. The cut grain is compelled to fall backward upon the platform in the rear of the cutting apparatus by the continued action of the reel. As the platform is quadrant shaped, it permits the cut grain to be moved backward head foremost from the cutting apparatus, swept around in a circular curve, and delivered at the angular side of the platform. In the present machine the movement of the grain on the platform and its delivery are effected by the automatic rake, which operates as follows: Suppose the parts to occupy the position shown in Fig. 1. As the machine advances the pinion $r$ and rake-rod R are caused to revolve, which causes the pinion S to roll along from front to rear of the platform in contact with the teeth of the upper side of the endless rack T, against which it is held by the projecting end of the rake-rod R, which rolls along the upper edge of the guide-plate U, and which supports the outer end of the rake. The guide-rod X travels in the groove Y, and, as it is below the level of the pinion S, while the latter is in contact with the upper teeth of the rack, the points of the rake-teeth are held firmly down upon the platform while raking off the grain, which is swept around on an arc of a circle (of which the univeral joint $r'$ forms the center) and discharged heads foremost upon the ground, at the side of the machine, behind the driving-wheel, crosswise to the direction of the swath, and far enough removed from the standing grain to be out of the path of the team when the machine comes round in cutting the next swath. When the pinion S has arrived at the rear end of the rack T, which point is marked 4 in the drawings—that is, when the gavel has been discharged—it descends until the lower side of the rack is reached, when it begins to run forward, being held down upon the teeth of the rack by the lower side of the guide-plate $u$. As the pinion descends it passes below the level of the groove $y$, in which the guide-rod $x$ travels, and as this rod forms the fulcrum of the rake its teeth are correspondingly elevated and held up until the pinion S reaches the limit of its forward motion, which point is marked 3 in the drawings. When the pin S begins to ascend the curved end of the rack the guide-rod slips into a slot in the forward end of the rack, which slot forms a continuation of the groove $y$, and is of a depth sufficient to permit the pinion S to rise without obstruction from the guide-rod. As the pinion rises the rake-teeth are correspondingly depressed, the guide-rod X still forming the fulcrum, and by the time the pinion has reached the upper side of the endless rack the rake-teeth are firmly pressed toward the platform and prevented from rising out of the grain which may have been received thereon.

I have called the platform above described "quadrant-shaped" because it is a convenient name to indicate its form, and not because the platform has the form of an exact quadrant of a circular disk, for it will be noticed that as the center of the universal joint on which the rake moves is a little in the rear of the cutting apparatus the front portion of the platform is straighter than the corresponding part of a geometrical quadrant, while the delivery side of the platform $q^2$ is not at a right angle with the front edge thereof next the finger-beam. The triangular point of the quadrant is also removed as unnecessary. The precise form of the platform is not important so long as the same mode of operation is preserved, by which I mean so long as the platform is so shaped and arranged in the rear of the cutting apparatus that the grain received thereon can be moved from the cutting apparatus head foremost and in a curve, and discharged crosswise to the direction of the swath and out of the way of the team or the machine when cutting the succeeding swath. Neither is it a matter of necessity that the rake, the mechanism for operating it, and the devices for preventing its teeth from rising out of the grain should be constructed as represented in the drawings, provided their construction is such that their mode of operation is preserved—that is to say, provided the rake-teeth are compelled to sweep over the platform in circular curves while moving the grain, and are also prevented from rising from their proper positions over the platform at that time by mechanism substantially as described.

The operations of the other parts of the machine are so well known to those skilled in the art of constructing reaping-machines that any further description of them is deemed unnecessary here, especially as they form no part of the subject-matter herein claimed.

What I claim under this patent as my invention is—

1. The combination, in a harvesting-machine, of the cutting apparatus to sever the stalks with a reel and with a quadrant-shaped platform located in the rear of the cutting apparatus, these three members being and operating substantially as set forth.

2. The combination, in a harvesting-machine, of the cutting apparatus with a quadrant-shaped platform in the rear of the cutting apparatus, a sweep-rake, mechanism for operating the same, and devices for preventing the rise of the rake-teeth when operating on the grain, these five members being and operating substantially as set forth.

In testimony whereof I have hereunto subscribed my name.

WILLIAM H. SEYMOUR.

Witnesses:
WILLIAM STOUGHTON,
GEO. H. ALLEN.